United States Patent [19]
Evans

[11] 3,889,878
[45] June 17, 1975

[54] MULTI-WAY VALVE AND POSITION CONTROLLER THEREFOR

[75] Inventor: John Richard Evans, London, England

[73] Assignee: Allen West and Company, Limited, Brighton, England

[22] Filed: Feb. 16, 1973

[21] Appl. No.: 332,821

[52] U.S. Cl. .............................. 237/8 R; 236/1 B
[51] Int. Cl. ............................................. F24d 3/02
[58] Field of Search ......... 237/8 R, 63, 59; 236/1 B, 236/9 A

[56] References Cited
UNITED STATES PATENTS
2,530,563   11/1950   Baxter et al. .................... 236/1 B

*Primary Examiner*—William E. Wayner
*Attorney, Agent, or Firm*—Holman & Stern

[57] ABSTRACT

I provide a controller for a distribution valve for a central heating system having a number of sub-circuits, and I also provide a distribution valve for the sub-circuits. The controller has a position sensor for each way through the valve and each position sensor has a selector switch controlled by the position of the valve and a control switch controlled manually or by a thermostat; when for instance the control switch is switched to open the respective valve way, the valve turns until the selector switch signals that the way is open. Any possible way and any possible combination of ways can be opened through the valve, according to the position of the valve.

16 Claims, 23 Drawing Figures

MULTI-WAY VALVE AND POSITION CONTROLLER THEREFOR

BACKGROUND OF THE INVENTION

This invention relates to a multi-way valve which is selective, i.e. it is arranged such that each way is either open or closed, and is not a proportioning valve, and to the control of such a valve using a position controller. The valve has positions for single ways through the valve and for a combination or different combinations of the ways, and optionally also for no flow. The valve can be driven by a motor such as an electric motor; the motor must be started to change the position of the valve and stopped when the correct position is reached.

A preferred application of such a valve is to the control of a circulating fluid heat transfer system such as a circulating hot fluid central heating system, where the valve can be placed at the upstream (or even at the downstream) junction of a number of parallel circuits (e.g. in a three circuit arrangement, downstairs heating, upstairs heating and heating domestic hot water) for shutting off or connecting in the circuits according to temperatures sensed by respective thermostats associated with the individual circuits. However, though the invention is primarily applicable to a circulating fluid heat transfer system (e.g. a central heating system) having the fluid flow valve, it is envisaged that the invention could have applications in for instance the fields of process control, refrigeration systems, irrigation schemes, lubrication systems or district heating systems.

There are a number of conventional arrangements for selecting circuits in a central heating system. In one arrangement, using circulating hot water, there is a gravity (thermo-siphon) circuit forming part of a pump circuit, with no control valve. When the pump is not working, the gravity circuit alone is operative; when the pump is working, the whole circuit is operative, giving three alternatives (when the heater is off, there is of course no operative circuit). Using symbols for the alternatives, they are: no flow, A (gravity circuit alone) and A+B (whole circuit), but not B alone. In another arrangement, a diverter valve is used to open one of two circuits, giving the alternatives "no flow", "A" and "B," but not "A+B." In other arrangements, separate valves in each particular circuit are used to give the desired combination of circuits. None of these arrangements give all possible circuit combinations with a single valve.

It is not essential that all theoretically possible combinations of the ways through the valve be possible in practice, though it is preferred that all combinations be possible in order to provide a logical system. Furthermore, it would be possible to have one or more ways through the valve permanently open (e.g. for heating domestic hot water in a central heating system), but there may be a no flow position. Other controls (e.g. manual or time-clock controls) can be incorporated.

The meaning of the term "way" as used herein is explained as follows. If the valve has $n$ substantive inlet connections (the word substantive is defined below) and $m$ substantive outlet connections, the valve has $nm$ possible ways; for example, a valve with two substantive inlet connections $a$, $b$ and two substantive outlet connections $c$, $d$ has four possible ways, $ac$, $ad$, $bc$ and $bd$. Any ways which are permanently open are not counted. It is possible to have two or more inlet connections or two or more outlet connections which are always connected to each other, whatever the position of the valve; for instance, an outlet from the valve member may branch within the valve housing, giving two outlet connections from the same valve housing; in such circumstances, the connections are not separable from one another, i.e. cannot be put out of communication with one another by operation of the valve, said in effect provide only one substantive connection. The word "substantive" is used herein with such a meaning, and a substantive connection is either a single connection or two or more connections which are not separable from one another.

SUMMARY OF THE INVENTION

The Position Controller

According to the present invention, there is provided a position controller for a motor-driven, multi-way, fluid flow valve which has positions for each way, and for a combination, or combinations, of the ways, the controller having:

a selector member or members for moving in a fixed relationsip with the movable member of the valve, and respective sensors corresponding to the position of corresponding ways through the valve, whereby the state of each sensor can be changed from an open state to a closed state or vice versa, by the associated selector member, as the corresponding way through the valve is changed from open to closed, or vice versa, respectively by the movable member of the valve, and each sensor having also first (way to be open) and second (way to be closed) conditions and means for converting the sensor from one condition to the other (e.g. in response to a signal from a control element such as a thermostat) and each sensor being arranged such that if it is in its first condition and the valve is in a position closing the respective way (when the sensor will have been put into the closed state by the associated selector member) the sensor energises the motor, and if the sensor is in its first condition and the valve is in a position opening the respective way (when the sensor will have been put into the open state by the associated selector member) the sensor does not energise the motor, and each sensor being further arranged such that if it is in its second condition and the valve is in a position opening the respective way (when the sensor will have been put into the open state by the associated selector member) the sensor energises the motor, and if the sensor is in its second condition and the valve is in a position closing the respective way (when the sensor will have been put into the closed state by the associated selector member) the sensor does not energise the motor.

In this latter position, the valve will generally be in a position closing the respective way, but when the valve has no no flow position, the selector member(s) may be modified to put the respective sensors into the closed state at intermediate positions when the respective way may be partly (or even wholly) open or closed, either energisation of the motor being continued by other means, e.g. the locator member and locator switch described below, or effective flow through the valve being terminated by other means, e.g. switching off a pump or heater pumping or heating the fluid passing through the valve, for instance using the output switch described below.

When the sensor is put into its first condition, the respective way should become or be open, and when the sensor is put into its second condition, the respective way should become or be closed (or alternatively, either flow through the valve should be stopped by operation of the output or conditioning (e.g. heating) of the fluid passing through the valve should be stopped by the output, as described below).

The Control Valve

According to the present invention, there is also provided a multi-way selective fluid flow control valve having valve positions arranged such that any possible way or any possible combination of ways can be opened, according to the position of the valve, a no flow (all ways closed) condition being optional. For example, in the simplest case, the valve may have one inlet and two outlets, giving two ways, A and B; if the valve has no no flow condition, it will have three conditions, A + B, A and B; if the valve has a no flow condition, it will have four conditions.

The same conditions (a particular way or combination of ways open) may occur in more than one position of the valve.

The valve of the invention is particularly useful when it has one substantive inlet and two, three, four or five outlets, or one substantive outlet and two, three, four or five inlets, of which the two-way and three-way designs are preferred, though four-way and five-way designs are commercially feasable. In practice, where a greater number of ways (e.g. more than four or five) are required, the valve of the invention could be combined with another valve which, if desired, may also be in accordance with the invention; the two combined valves could be in one casing or housing if desired, and the casing or housing could have common connections for both valves, e.g. a single inlet (or outlet) connection.

The valve of the invention can be relatively cheap in that it can provide in a single valve facilities which are normally provided with a number of valves.

Though there is preferably either a single substantive inlet or a single substantive outlet, such an arrangement is not necessary. For instance, a four connection valve can have one inlet and three outlets or two inlets and two outlets. Furthermore, a valve can be converted by stopping off connections; for instance, the same valve construction can be used for a four connection valve as for a three connection valve; for the three connection valve, one connection is stopped off.

BRIEF DESCRIPTION OF THE DRAWINGS

The invention will be further described, by way of example, with reference to the accompanying drawings, of which:

FIGS. 11a and 11b through 16a and 16b show the co-operating valve ports in other embodiments of a multi-way control valve for the central heating system.

DETAILED DESCRIPTION OF A FIRST SPECIFIC EMBODIMENT OF THE INVENTION

Figure 1:
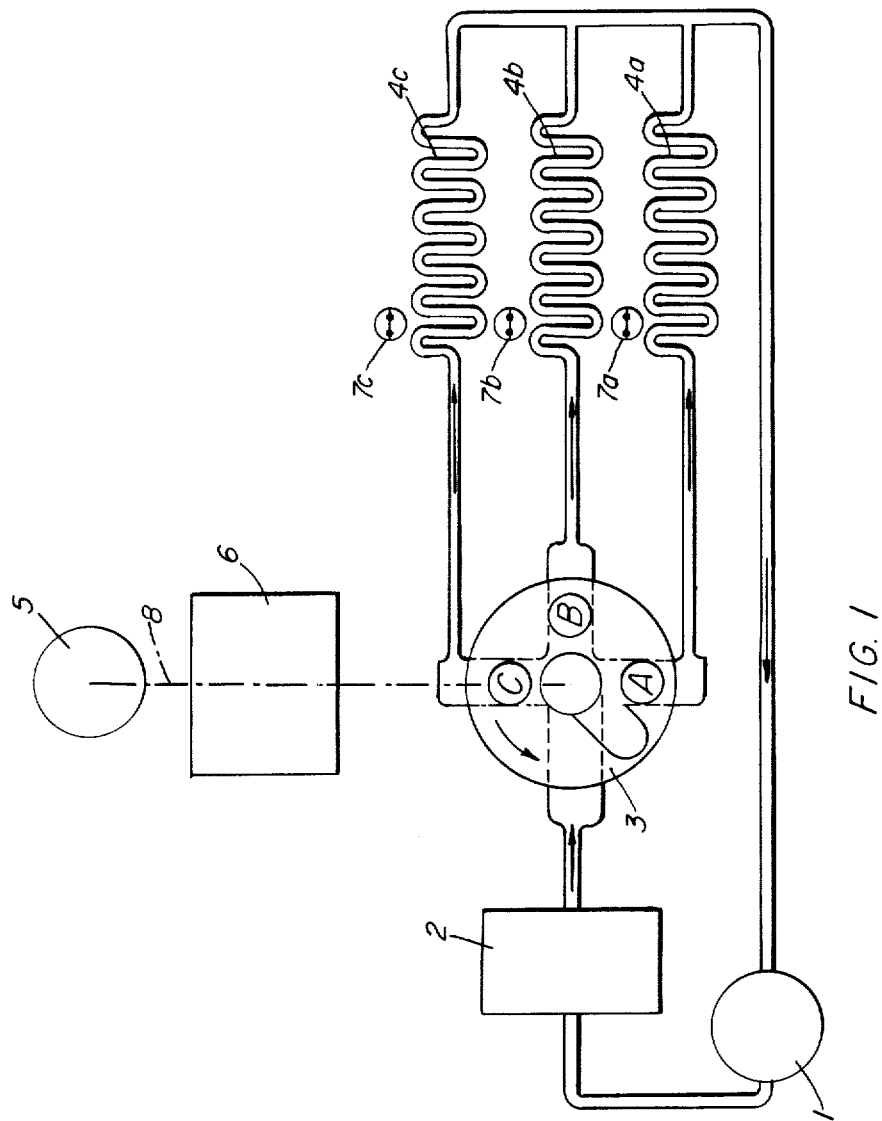
FIG. 1 is a schematic representation, in block diagram form, of a circulating hot water central heating system in accordance with the invention.

As shown in FIG. 1, a circulating hot water central heating system has an electric circulating pump 1, a heater 2, a multiway rotary control valve 3 and three heating circuits 4a, 4b and 4c. The movement of the control valve 3 from position to position is powered by an electric motor 5 and is controlled by a position controller 6 in response to the action of control switches 7a, 7b and 7c in the form of thermostatic change-over switches mounted in rooms (not shown) heated by the respective heating circuits 4a, 4b and 4c. The motor 5 is connected to the position controller 6 and to the valve 3 by a rotary shaft 8.

The Position Controller (First Embodiment)

Figure 2:
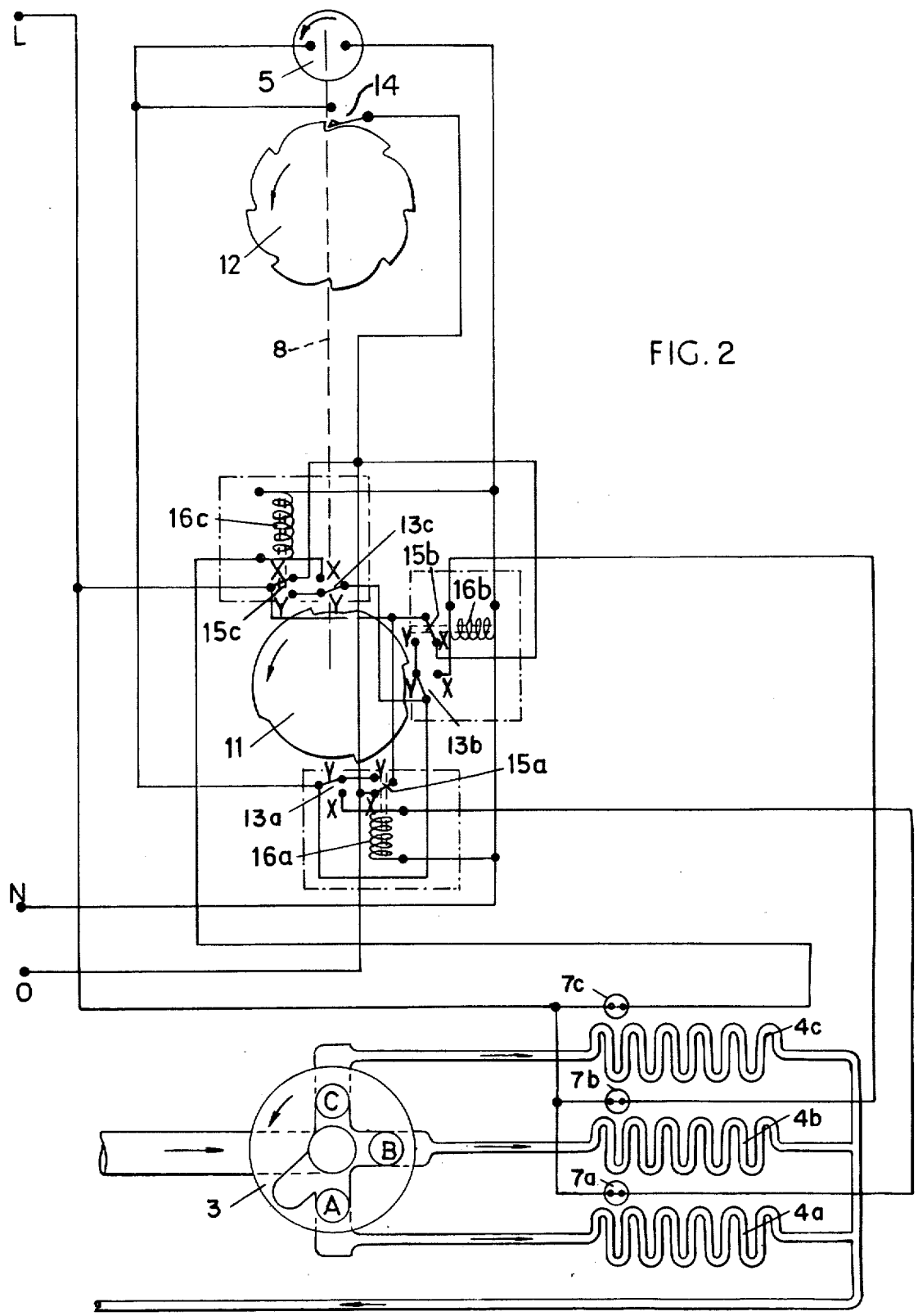
FIG. 2 is a circuit diagram illustrating a first embodiment of a position controller for the central heating system.

The position controller is shown in detail in FIG. 2. A selector member in the form of a selector cam 11 and a locator member in the form of a locator cam 12 are fixed to the shaft 8 (not shown in FIG. 2). The selector cam 11 has cut-outs on its perimeter coinciding angularly with the ports in the valve 3. Selector microswitches 13a, 13b and 13c are actuated by the selector cam 11, moving between X and Y positions, and a locator micro-switch 14 is actuated by the locator cam 12, moving between an open position and a closed position. The selector switches 13a, 13b and 13c are secured so as to be in the X position when the corresponding valve port A, B or C is closed.

Figure 3:
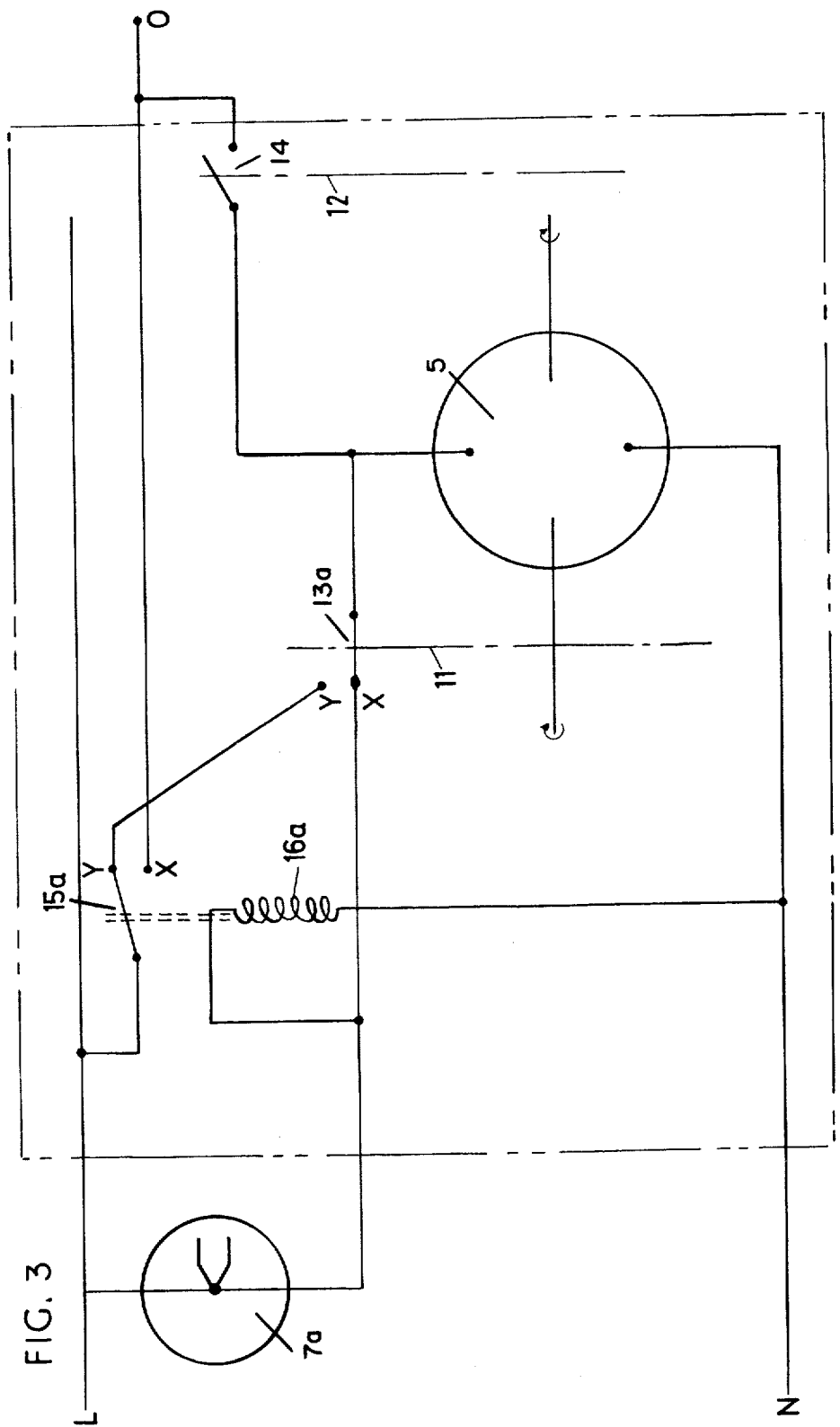
FIG. 3 is a simplified circuit diagram for one of the position sensors of the position controller of FIG. 2.

For convenience, a selector switch 13a, 13b or 13c and its associated circuit, including the respective control switch 7a, 7b or 7c is termed a sensor herein, and one sensor is shown in FIG. 3. As can be seen in FIG. 3, the sensor includes the control switch 7a which normally controls a subsidiary, slave switch 15a in parallel with the control switch 7a, by means of a relay 16a (sometimes the control switch 7a does not control the subsidiary switch 15a, but this is explained in more detail below); in general, when the control switch 7a is open, the subsidiary switch 15a will be in its Y position, and when the control switch 7a is closed, the subsidiary switch 15a will be in its X position (i.e. the output O is energized whenever the control switch is closed). Both the control switch 7a and the subsidiary switch 15a are connected to the selector switch 13a, the selector switch 13 a being in effect in series with the subsidiary switch 15a by having its pole Y connected to the pole Y of the subsidiary switch 15a, and in series with the control switch 7a by having its pole X connected to the control switch 7a. The other pole X of the subsidiary switch 15a is connected to an output O which can be used to condition the water controlled by the valve 3, either by energizing the circulating pump 1 or by energizing a solenoid-controlled main burner valve (not shown) in the heater 2.

The locator switch 14 is connected in parallel to the control switch 7a and the selector switch 13a, i.e. in parallel with all the sensors, and is operated by the locator cam so as to be open when the valve 3 is in any one of its desired positions. The locator switch 14 is fed from the live output of the subsidiary switches 15a. The locator cam 12 has a zone corresponding to the no flow position of the valve.

The Operation of the First Embodiment of the Position Controller

For convenience in understanding the principle of operation of the position controller, it can be said that each sensor has two conditions and two states. When the control switch 7a is closed, the temperature in the room is below a predetermined, set temperature and the heating circuit 4a is to be supplied with hot water by opening the valve port A — the sensor is in its first condition, i.e. the valve port associated with the sensor should be open. When the control switch 7a is open, the temperature in the room is above the predetermined, set temperature and the valve port A should be closed — the sensor is in its second condition, i.e. the valve port associated with the sensor should be closed. On the other hand, when the valve port A is actually closed, the selector switch 13a is in its X position — the sensor is in its closed state. When the valve port A is actually open, the selector switch 13a is in its Y position — the sensor is in its open state.

On this basis, the circuits and switches are arranged such that the motor 5 is energized when the sensor is in its first condition (valve port should be open) and the closed state (valve port actually closed) and also when the sensor is in the second condition (valve port should be closed) and the open state (valve port actually open); conversely, the motor 5 is de-energized when the sensor is in its first condition (valve port should be open) and the open state (valve port actually open) and also when the sensor is in the second condition (valve port should be closed) and the closed state (valve port actually closed). In this manner, the sensors can position the valve in any of its eight possible positions (see FIG. 6a, described below).

The situation shown in FIG. 2 is the "all ways open" position of the valve 3 with the motor 5 de-energized. Thus all three sensors are in the first condition and the "open" state.

The situation in FIG. 3 is different. The control switch 7a is open, putting the sensor in its second condition (valve port should be closed), whilst the selector switch 13a is in its X position (valve port actually closed), and the operating motor 5 is thereby de-energized. It will be seen that if the control switch 7a closes, the sensor is put into its first condition. The motor 5 is energized and the relay 16a pulls in the subsidiary switch 15a to energize the output O. As the motor 5 turns, the locator switch 14 will close when the valve 3 reaches an intermediate position, and will also energize the motor 5 along a parallel path. As the valve moves through an intermediate position, approaching a position where the respective way through the valve 3 will open, the selector cam 11 will operate the selector switch 13a to its Y position so that the motor 5 is no longer energized by the sensor circuit. The motor 5, however, is still energized via the locator switch 14, and will continue to turn the valve 3 until the precise position is reached where the respective way through the valve 3 is fully open, at which position the locator switch 14 is opened by the locator cam 12, the motor 5 is de-energized, and the valve 3 stops. The output O however remains live.

It will be noted from FIG. 3 that if the control switch 7a and the selector switch 13a are in the position shown, and if another sensor continues to energise the motor 5, the relay 16a will continue to be fed because it is in parallel with the motor 5. This will cause the relay 16a to pull in the subsidiary switch 15a and the sensor of FIG. 3 will switch on the output O even though the control switch 7a is open and the sensor is in the second condition.

This has the advantage that the output O will be live at all positions of the valve, except that an interruption occurs when none of the control switches 7a, 7b and 7c are closed, which is as desired at the no flow position, and also when none of the control switches 7a, 7b and 7c are closed and none of the selector switches 13a, 13b and 13c are in the X position, which occurs when the valve 3 is passing through the all ways open position seeking the no flow position, i.e no relay is fed by a control switch and no relay is fed via the X contact of a selector switch from the live supply to the motor. Such an interruption occurs particularly when using the subsidiary relay-operated switches 15a, 15b and 15c. It may be desirable to keep the output on until the valve reaches the no flow position due to the arrangement of the position controller 6, and the momentary interruption at the all ways open position can cause an unwanted blip in the output O, the length of the interruption depending on the speed of the driving motor 5 and the interval between operation of the selector switches 13a, 13b and 13c. In a central heating system, an interruption of this nature to the fuel supply of some burners can be dangerous, and this could occur if the heater of a circulating hot fluid central heating system is energised through the output O. Such an interruption can be mainly avoided if the valve 3 is arranged such that, and the motor 5 is energised such that, the all ways open position of the valve follows directly after the no flow position; in this case, such momentary interruption only occurs in the unlikely event that all sensors are switched from their first condition to their second condition simultaneously, for instance when all thermostats, i.e. control switches 7a, 7b and 7c, open simultaneously.

The incorporation of the locator cam 12 and switch 14 gives the following advantages:

Due to machining and assembly tolerances in mass production (e.g. due to production differences in the selector cams and in the selector switches and due to differences in the assembly thereof into different position controllers), the valve may stop in a false position intermediate positions fully opening or closing different valve ports, in which false position the sensors happen to be in a condition all requiring the motor 5 to be de-energised. For instance, the "A+B+C" position occurs after the no flow position. In the no flow position, the selector cam puts the selector switches in each sensor circuit into the closed state, and in the A+B+C position the selector cam puts the selector switches in each sensor circuit into the open state; also in the A position, the A sensor circuit is still in the open state whilst the B and C sensor circuits are put into the closed state, and likewise for the B and C positions. Now suppose that the position controller is moving from the no flow position to the A+B+C position, and the selector cam 11 operates the selector switch 13a in the A circuit to put the A circuit into the open state before the B circuit is put into the open state. It will be noted that a set of conditions exists which is the same as for the A position of the valve, yet the valve is at some intermediate position between no flow and A+B+C; thus if the position controller 6 was required to move from the no flow position because the A sensor circuit was switched to its first condition, the motor 5 would be de-energized and the valve 3 would stop at this false position. Similarly, if when the position controller is moving from the no flow position to the A+B+ C position, the selector cam 11 operates the selector switch 13b in the B circuit to put the B circuit into the open state before the A circuit is put into the open state, and a set of conditions exists which is the same as for the B position yet the valve 3 is at some intermediate position between no flow and A+B; thus if the position controller 6 was required to move from the no flow position because the B sensor circuit was switched to its first condition, the motor 5 would be de-energized and the valve 3 would stop at this false position. This difficulty may be avoided by adjusting the components of the controller 6 so that the selector cam 11 operates the A and B selector switches 13a and 13b simultaneously, but this is difficult, if not impossible, to achieve and maintain in practice.

However, the locator cam 12 energizes the motor 5 a small distance past each position of the valve 3 and maintains this energization up to the next position precisely, thus allowing the sensors corresponding to the ports of the valve to determine whether the valve stops at that position or proceeds to the next position.

The locator switch 14 ceases energising the motor 5 precisely at each "flow" position of the valve 3 and re-energizes the motor a short distance past each flow position. In other words, the locator cam 12 allows the sensors to assess the state of the valve 3, only at each flow position and, if desired, at the no flow position as well. If at the position in question, the motor 5 remains de-energized, that is the position required; if the motor 5 is energized, the valve 3 continues to move and the locator switch 14 also energizes the motor after a short movement of the valve. Obviously, if the inertia of the moving parts is great, a brake (not shown) must be applied, preferably by the same means as that which de-energizes the motor 3 (e.g. a brake which is allowed to act on the shaft when a solenoid is de-energized), or with some arrangements a brake alone may be energized or de-energized by the position controller 6, holding the motor stalled when a desired position is held.

The Multi-Way Control Valve (First Embodiment)

The valve 3 is shown in FIGS. 4 to 6b. The valve has a valve body 21 and a rotary valve disc 22 secured to the shaft 8. There is an inlet connection 24 leading to the upper side of the valve disc 22 and a number of outlet connections 25 leading from the base of the valve body 21.

Figure 4:
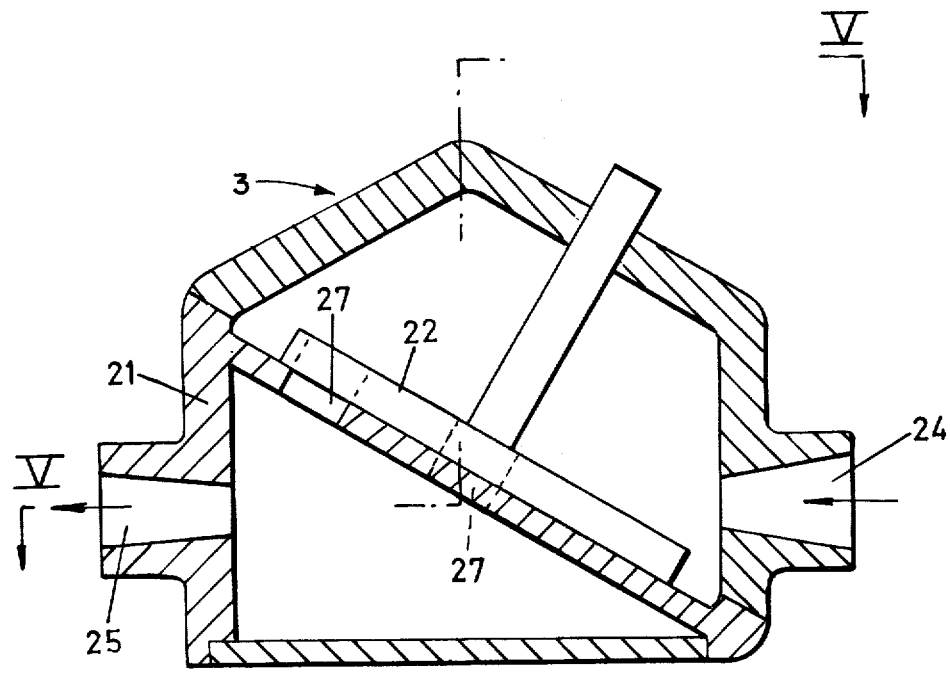
FIG. 4 is an axial section (along the line IV—IV of FIG. 5) through a first embodiment of a multi-way control valve for the central heating system.
Figure 5:
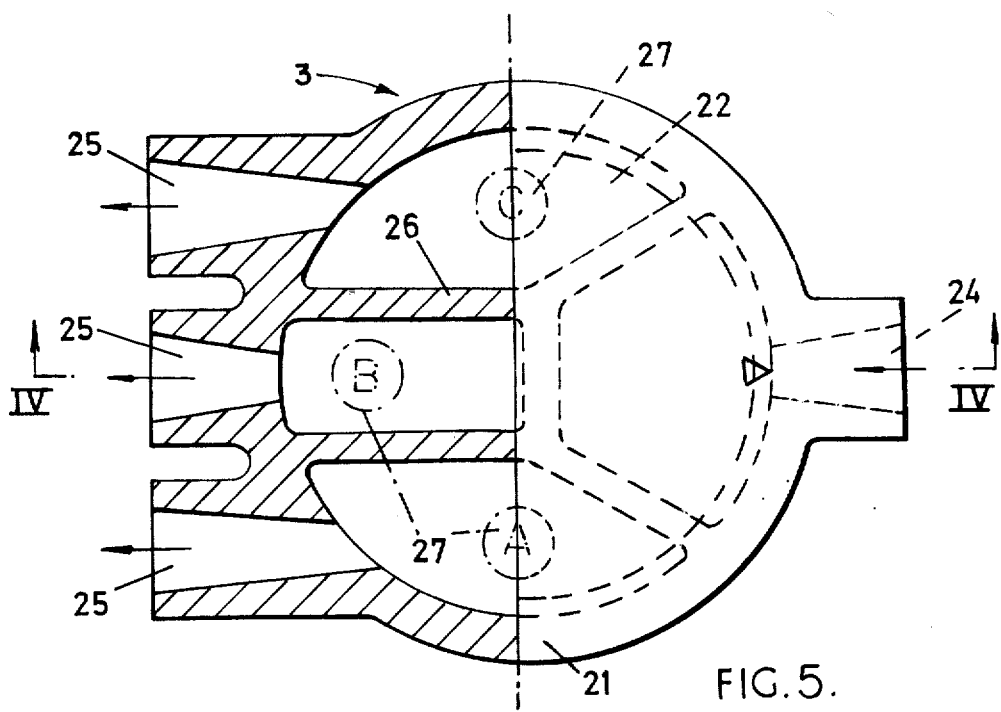
FIG. 5 is a part section along the line V—V of FIG. 4.
Figure 11A:
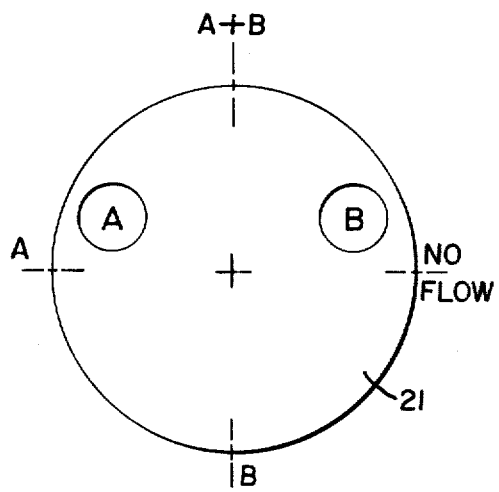
Figure 11B:
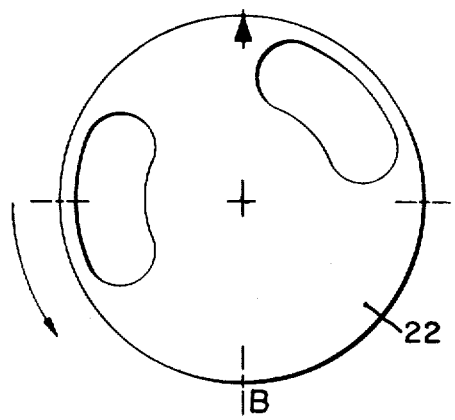

The schematic section of FIG. 5 indicates how dividing walls 26 are provided in the base of the valve body 21, the position of the ports 27 in the valve body 21 being shown dotted and indicated as A, B and C. The construction shown in FIGS. 4 and 5 provides a fairly straight line flow through the valve because the connections 24 and 25 lie in a single plane which is inclined to the axis of rotation of the valve.

Figure 6A:
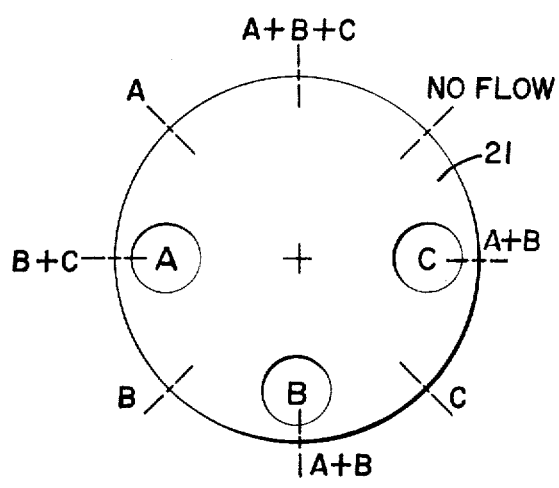
FIG. 6a and 6b show the co-operating valve ports in the valve of FIG. 4.
Figure 6B:
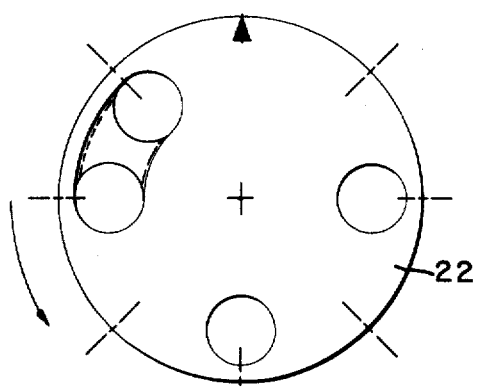
Figure 12A:
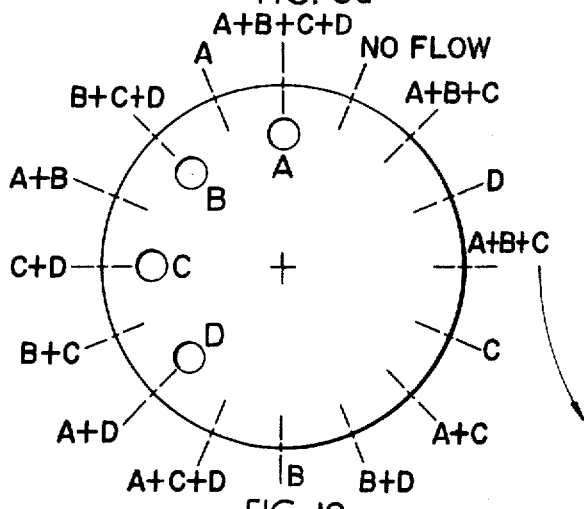
Figure 12B:
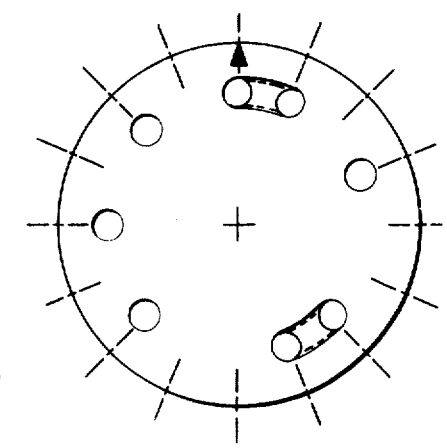

The positioning of the ports is shown in FIGS. 6a and 6b. For the purpose of explaining the Figures only, an arrow head is indicated on the valve disc 22 and reference marks are indicated around the valve body 21, showing the connections or ways which are open when the arrow points to the mark in question. There is a no flow position immediately before the A+B+C or "all ways open" position.

The valve is advantageous, giving eight different flow combinations although the ports on the valve body 21 are spaced around a single circle and the ports on the valve disc 22 are likewise spaced around a single circle. Because many different flow combinations are provided with a single valve, cost can be reduced and control, particularly automatic control, can be greatly simplified, the control being further simplified by the valve positions being equi-spaced.

Second Embodiment of the Position Controller

Figure 7:
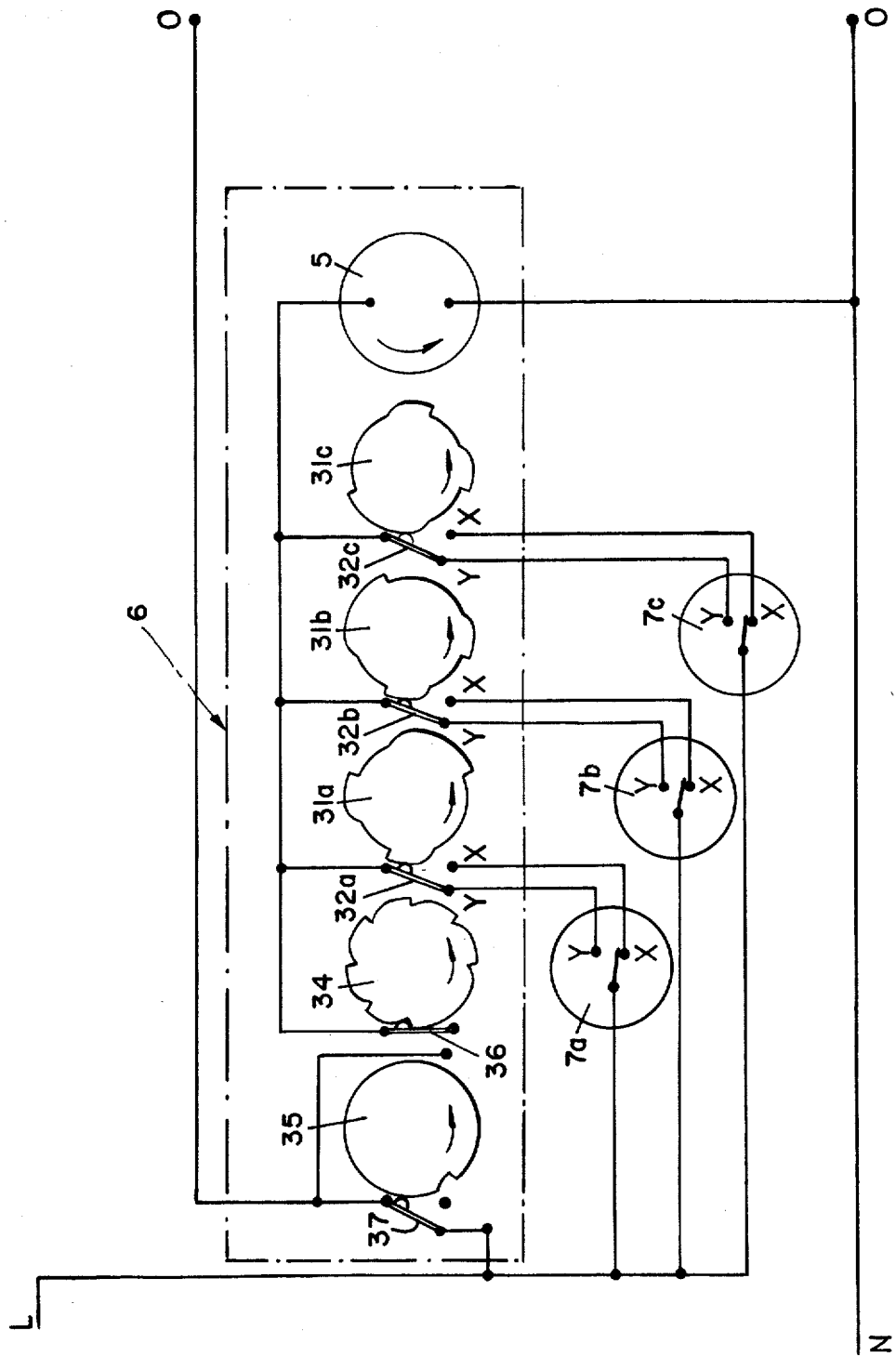
FIG. 7 is a circuit diagram illustrating a second embodiment of a position controller for the central heating system.

The second embodiment is shown in FIG. 7 and is a simple and inexpensive alternative to the first embodiment.

The position controller 6 has three selector members in the form of selector cams 31a, 31b and 31c fixed to the shaft 8, which cams actuate three selector micro-switches 32a, 32b and 32c. The selector cams have raised forms on the perimeter coinciding angularly with the ports in the valve 3 shown in FIG. 1. The selector cams are all of the same shape but cam 31b is turned through 90° anti-clockwise relative to cam 31a and cam 31c is turned through 180° anti-clockwise relative to cam 31a; the cams are in these relative positions because the position controller is for the valve 3 shown in FIGS. 6a and 6b where port B, for which the corresponding selector cam is cam 31b, is at 90° anti-clockwise to port A, for which the corresponding selector cam is cam 31a; similarly port C is 180° anti-clockwise from port A. This disposition of the selector cams 31a, 31b and 31c enables the selector switches to be in the same angular position relative to the shaft 8 and be stacked together.

The position controller 6 of FIG. 7 also has a locator cam 34 and an output cam 35 fixed to the shaft 8, actuating a respective locator micro-switch 36 and an output micro-switch 37. The locator switch 36 is connected to the output side of the output switch 37, to prevent transient switching off of the output when passing the no flow position of the valve 3, and the locator cam 34 does not have a locating position corresponding to the no flow position of the valve 3 (i.e. the locator cam 34 does not have a notch in the position corresponding to the single notch in the output cam 34), the output switch 37 carrying out the function of the locator, in de-energizing the motor 5 precisely at the no flow position.

Each selector switch 32a, 32b and 32c is a changeover switch and is connected in series with a respective thermostatic control switch 38a, 38b and 38c (corresponding to the control switches 7a, 7b and 7c in FIG. 1) by connecting respective poles X, X and Y, Y to each other and forming two-way electrical paths.

Operation of the Second Embodiment of the Position Controller

The electric circuits formed by the respective selector and control switches 32a, 38a, etc., form sensors (one corresponding to each port in the valve 3) in the manner described above in relation to the first embodiment of the position controller. When the control switch 38a, 38b or 38c is in the X position, the sensor is in its first condition (valve port should be open); when the control switch 38a, 38b or 38c is in its Y position, the sensor is in the second condition (valve port should be closed). When the selector switch 32a, 32b and 32c is in its Y position, the sensor is in the open state (valve port actually open); when the selector switch 32a, 32b and 32c is in its X position, the sensor is in the closed state (valve port actually closed).

The position of the controller 6 shown in FIG. 7 is an at rest position such that the valve 3 is in the all ways open position, all the control switches 38a, 38b and 38c being in the X position and all the selector switches 32a, 32b and 32c being in the Y position disconnecting the motor 5 from the power supply. The output switch 37 is closed, energising the output at OO.

In view of the explanation of the first embodiment given above, the detailed operation of the second embodiment need not be described. It should be noted that when passing the no flow position, one of the control switches 38a, 38b or 38c must be in its X position and all of the selector switches 32a, 32b and 32c must be in their X position so that the motor 5 is energized. At the same time, the moving contact of the locator switch 36 will be energized and the locator switch 36 will be in its closed position, thus keeping the output OO switched on even though the output switch 37 is open.

Third Embodiment of the Position Controller

In general, the first and second embodiments can be modified for use with a two port valve by omitting one sensor, and for use with four or more port valves by appropriately adding sensors.

Figure 8:
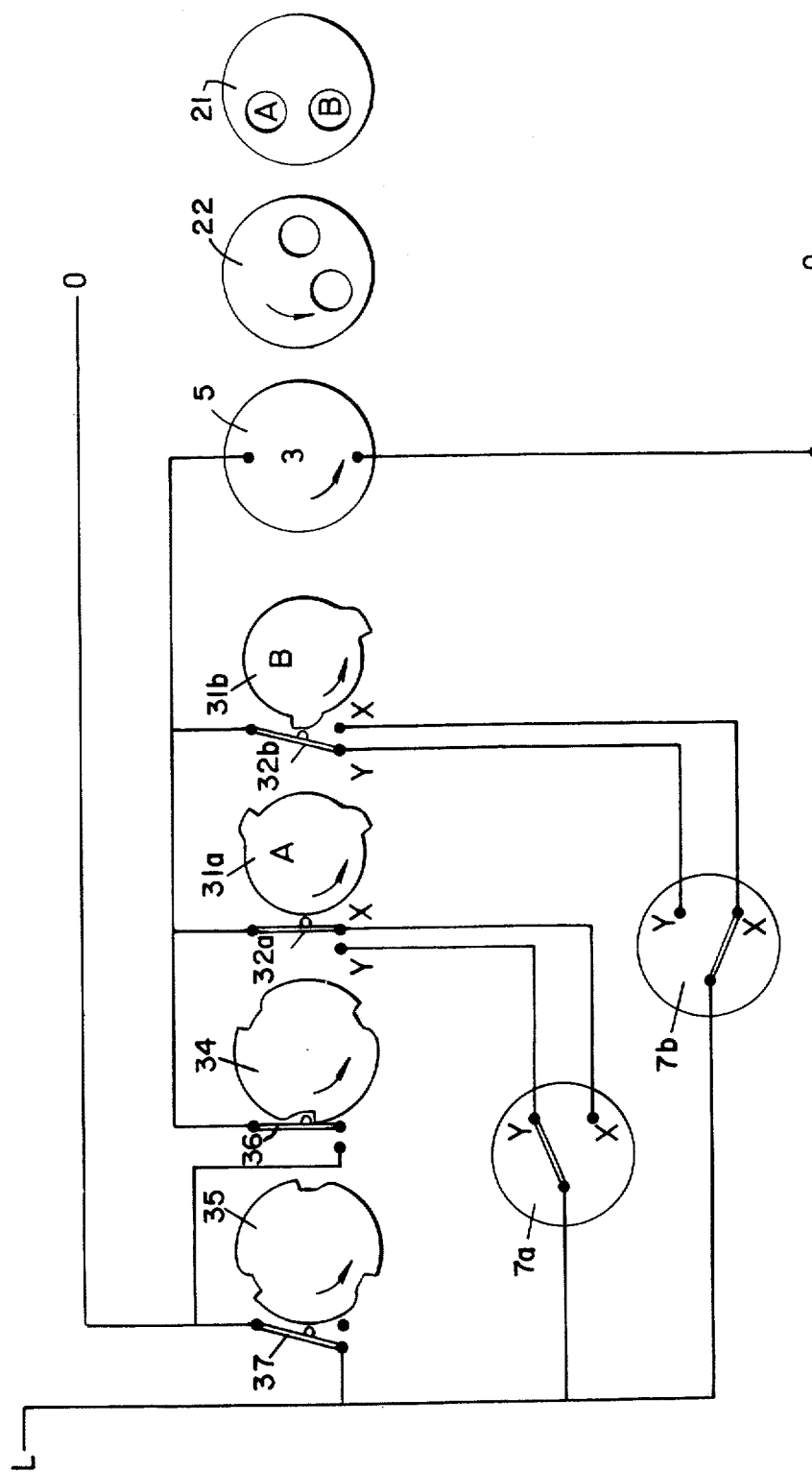
FIG. 8 is a circuit diagram illustrating a third embodiment of a position controller for the central heating system.

The third embodiment is shown in FIG. 8, and is in effect the second embodiment modified for use with a two port, three position valve — the three positions are A+B, A and B; there is no no flow position as such, but the valve has three effective no flow positions intermediate the flow positions.

The references used in FIG. 8 are all shown in FIG. 7, and the third embodiment need not be described in more detail.

The selector cams 31a and 31b are designed so that both selector switches 32a and 32b, respectively, are in their Y positions at each of the three intermediate positions referred to above.

Because there are three effective no flow positions determined by the design of the selector cam, or cams, the output cam 35 has three zones, since it serves the function of locating the valve in the no flow position as described earlier; thus the locator cam 34 and output cam 35 are identical and a single cam may be used, with the locator switch 36 and the output switch 37 disposed around the cam in the correct relative positions.

If a valve design is to be employed which does not have a no flow condition, a suitable stopping position for the controller, called an effective no flow position, is provided adjacent at least one flow position of the valve. There may be one or more such effective no flow positions.

The no flow condition, where all the outlets are disconnected from the inlet or inlets, may be regarded as a special case. For instance it may be dangerous for such a condition to exist, or, as is the case with certain embodiments of the valve (e.g. a disc type valve with the flow forcing the disc against the valve body), a much greater torque may be required to turn the valve through this no flow condition than elsewhere. Where the above difficulties arise, the valve may not have a no flow condition.

However, the position controller must have at least one position of rest while all sensor circuits are in their second condition. This may be conveniently arranged by having all the selector members operating the associated sensors to the closed state at a position or positions intermediate (e.g. halfway between) any, or each two, consecutive defined flow positions, preferably at respective positions intermediate each two consecutive defined flow positions. Where there is not a no flow position of the valve, and this condition is provided by the position controller stopping at all intermediate positions, and where the effective flow can be stopped by switching off the output O of the position controller, the output switch may be conveniently operated by the locator cam, the output switch being displaced about the locator cam from the locator switch by e.g. half the distance between two no flow positions plus any number of whole distances between two flow positions. The position controller will then have as many effective no flow positions as it has flow positions, the selector cam or cams being arranged in this case to operate all sensor circuits into the second condition at each position intermediate the defined flow position.

Operation of the Third Embodiment of the Position Controller

The position controller is shown in an "at rest" condition in a flow position opening the B way only. If the control switch 38b is operated to its Y position (i.e. both control switches in the Y position), the position controller is set to seek a no flow condition. The motor 5 will be energised through the selector switch 32b, and after a short movement also through the locator switch 36. After the locator switch 36 has closed, the selector cam 31b will operate the selector switch 32b into its X position (the selector switch 32b is already in its X position). The valve will continue to turn, the motor 5 now being energized via the output switch 37 and the locator switch 36. At a position 60° from the position shown, the output cam 35 will open the output switch 37 and de-energize the motor 5, and also de-energize the output OO. It will be noted that this is an effective no flow position although the valve itself would be partly open to both A and B ways.

FURTHER EMBODIMENTS OF THE POSITION CONTROLLER

It will be appreciated without illustration and detailed description that instead of the cam follower micro-switches used for the selector members and/or the output member and/or the locator member, one may alternatively use rotary switches with respective rotary contacts and a number of fixed contacts, either of the conventional type or having contact strips printed on to a carrier and wiper moving contacts.

It will also be appreciated without illustration and detailed description that hydraulic circuits (e.g. using spool valves) or penumatic circuits analogous to the above described electrical circuits could be provided in the position controller.

It will further be appreciated without illustration and detailed description that the locator switch 14 of the first embodiment of the position controller (see FIG. 3) may alternatively be connected between the electric motor 5 and the live input L instead of being connected between the electric motor 5 and the live output of the subsidiary switches 15a.

In general, a single selector member may be employed having selector elements of the sensors positioned relative to each other to correspond with the relative positions of the respective ways in the valve. Thus in the second embodiment, the selector switches 32a, 32b and 32c may be disposed about a single selector cam of the same form as the selector cams 31a, 31b and 31c at 0°, 90° anti-clockwise and 180° anti-clockwise, respectively, generally as shown in FIG. 2.

Any of the control switches 7a, 7b, 7c or 38a, 38b and 38c could be a manual switch or a time control switch or represent a number of switches in series. Additional controls (e.g. time, manual, frost thermostats, etc.) can be connected in series with the control switch of any sensor circuit. The position controller would preferably have a device for indicating which ways through the valve are open, which may be a mechanical device (for instance a pointer moving with the valve and indicating against legends which flow paths are open) or may be electrical (e.g. neon indicators for indicating which sensors are in the first condition).

For convenience, the controller has been described as it is applied to the control of a motor-driven, multi-way, fluid flow valve. However, the invention is broader and can be applied to the control of any movable member having a number of positions and whose position is to be controlled automatically. For instance, the movable member could be a switching member switching on and off individual colours and colour combinations in lighting for stage or filming, or could be a switching member switching on and off high voltage electricity circuits. In the latter case, the number of solenoid relays required for automatic switching could be markedly reduced, or the solenoid relays could be eliminated altogether.

SECOND EMBODIMENT OF THE MULTI-WAY CONTROL VALVE

Figure 9:
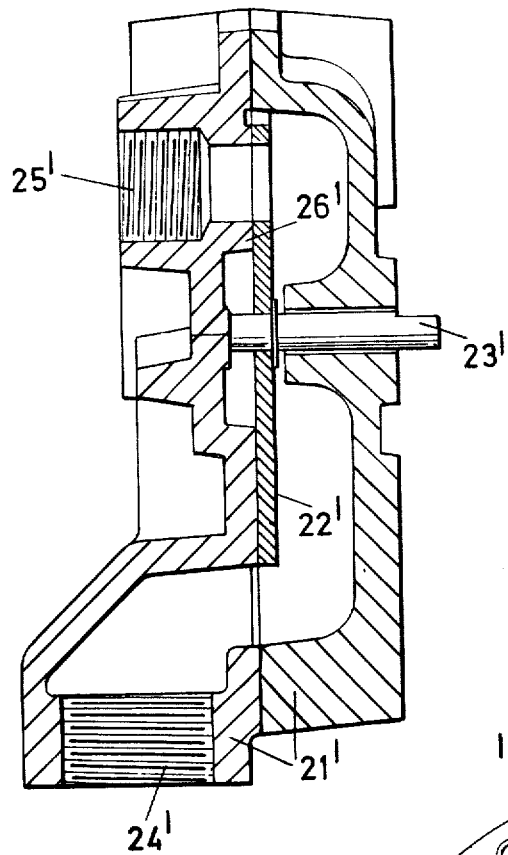
FIG. 9 is an axial section (along the line IX—IX of FIG. 10) through a second embodiment of a multi-way control valve for the central heating system.
Figure 10:
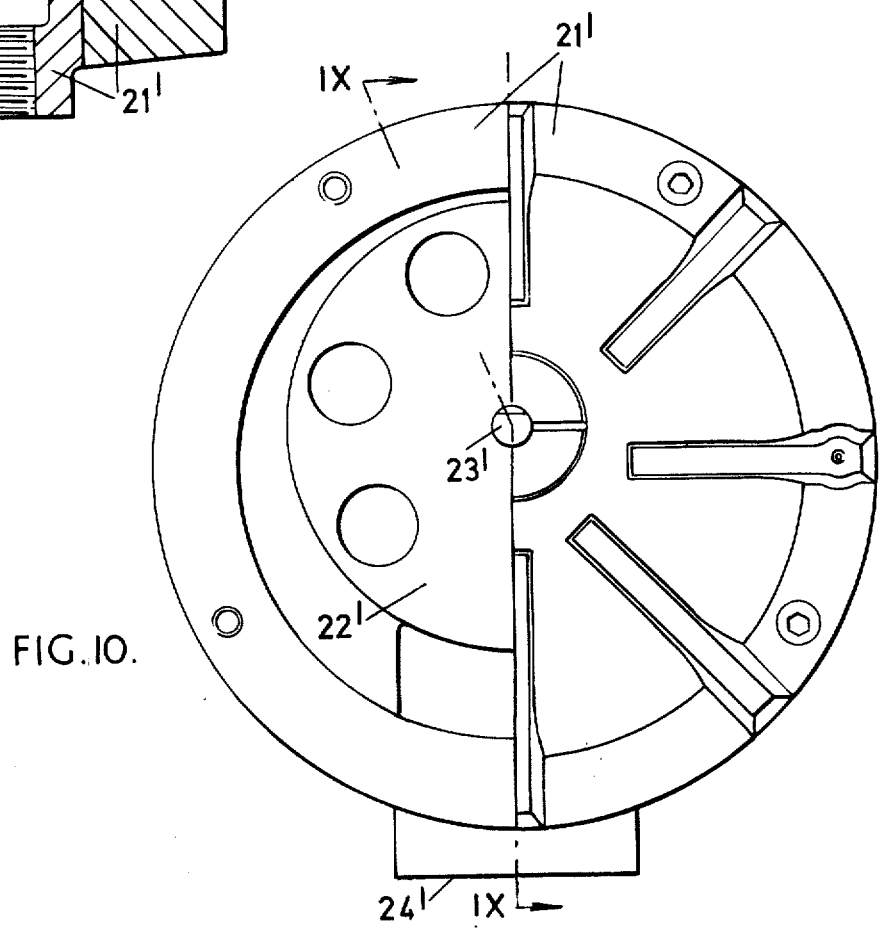
FIG. 10 is a plan view of the embodiment of FIG. 9, with the left-hand side of the chamber cut away.
Figure 13A:
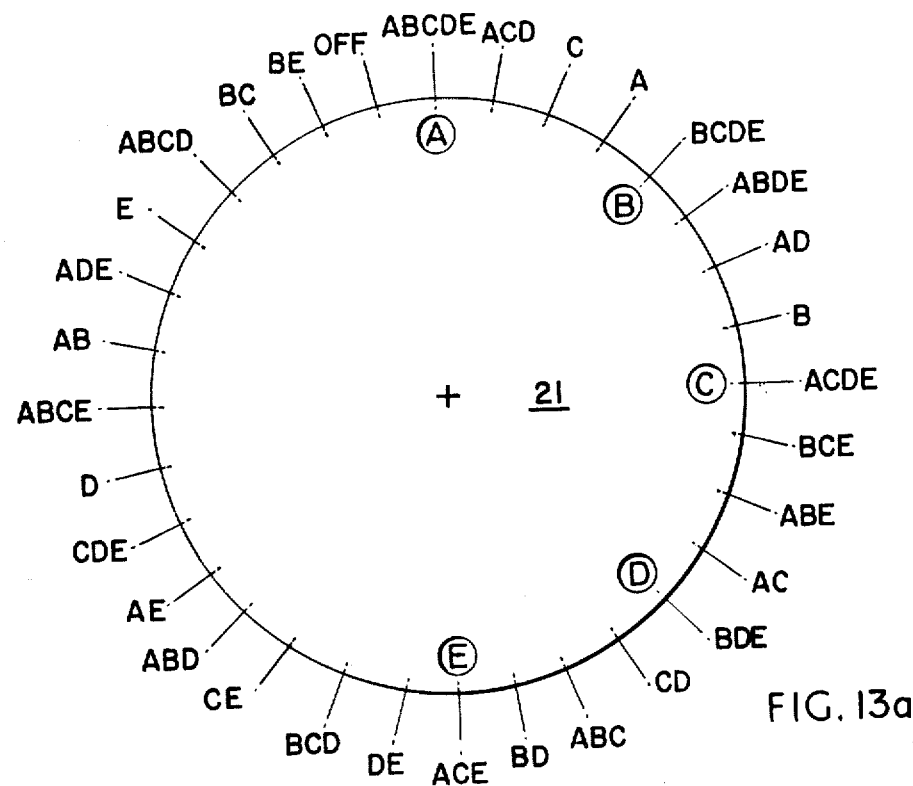
Figure 13B:
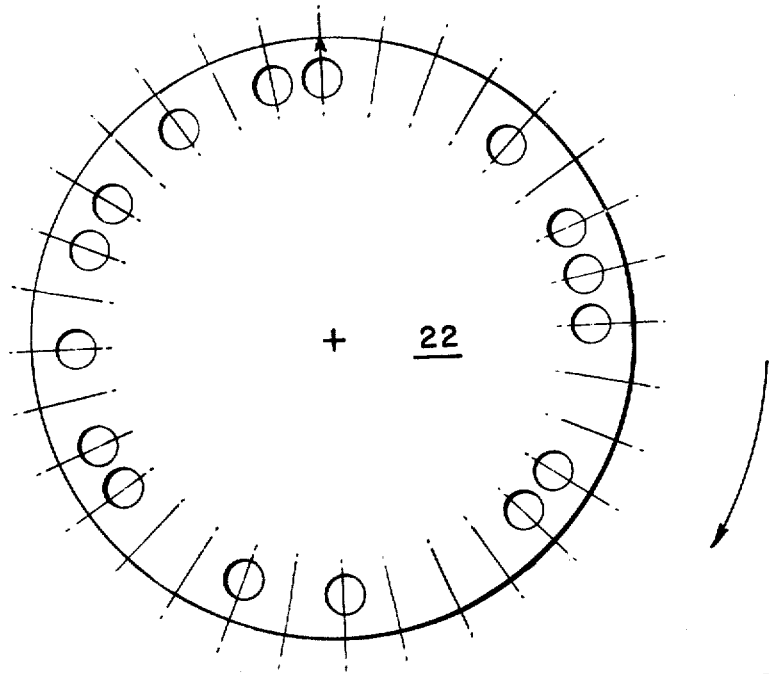
Figure 14A:
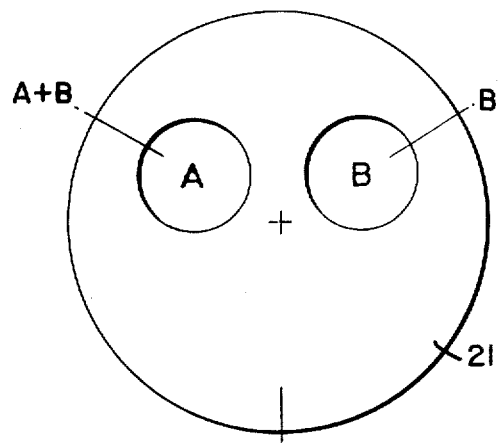
Figure 14B:
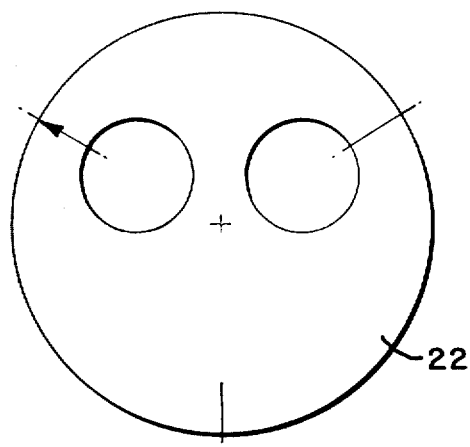
Figure 15A:
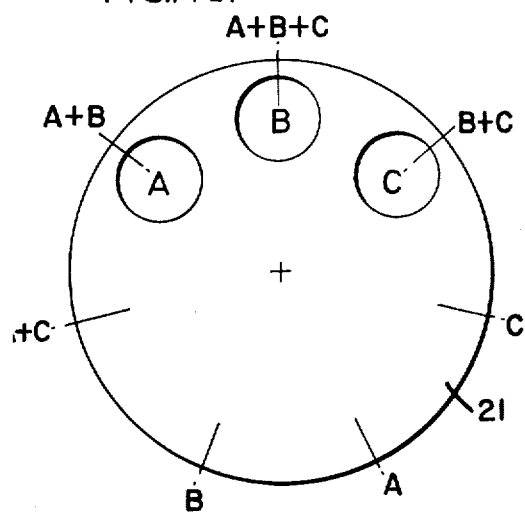
Figure 15B:
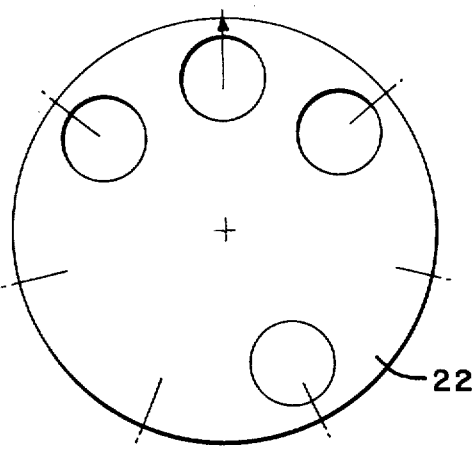
Figure 16A:
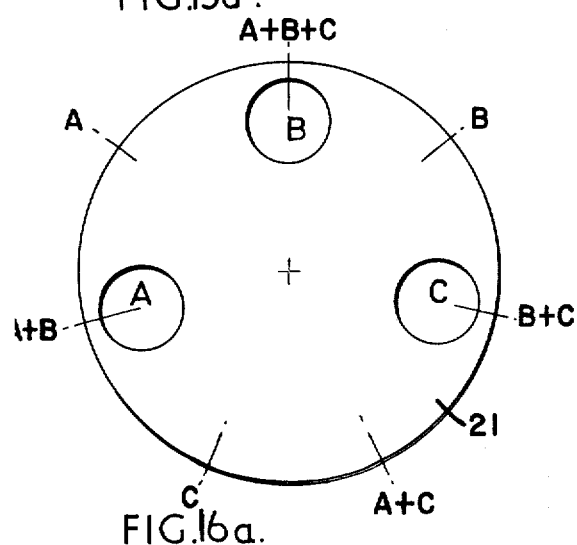
Figure 16B:
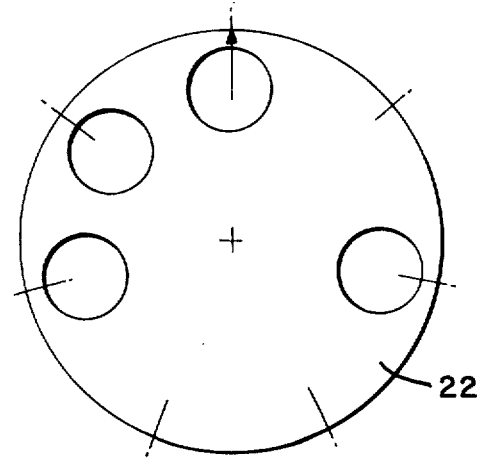

The embodiment shown in FIGS. 9 and 10 is easier to manufacture, but produces a less straight flow path. The valve need not be described in detail as the same references, but primed, are used for parts which correspond to those in FIGS. 4 and 5. The two part valve body 21' can be made of cast iron.

Modifications in the Construction of the Multi-Way Control Valve

In the first and second embodiments, the port-carrying faces of the valve body 21, 21' and valve disc 22, 22' are planar; however, it is possible to have such port-carrying faces in the form of conical surfaces of large half angle.

Though not shown, for manufacturing convenience the four-connection valves of FIGS. 4, 5 and 8, 9 could be used as three-connection valves by stopping-off one of the connections, e.g. by stopping-off the inlet connection 24 and using one of the outlet connections 25 as an inlet connection.

FURTHER EMBODIMENTS OF THE MULTI-WAY CONTROL VALVE

In general, if n is the number of ways through the valve, there are preferably n effective ports for registering with ($2^n/2$) effective ports in the other valve member of the valve; by "effective" in this context is meant for example that even if say two adjacent ports are joined to each other to form a single opening, they will still form two effective ports.

FIGS. 11a to 16b correspond to FIGS. 6a and 6b, but show valves with different port arrangements or a different number of ports. All the valves are capable of opening all possible combinations of the ways through the valve (though a no flow condition may not be provided). The dashed lines in FIGS. 6b, 10b and 11b show that two adjacent ports can be joined together to form a single port.

FIGS. 11a to 13b show the preferred arrangement of the valve ports in the multi-way valve having a no flow condition — other arrangements are possible.

FIGS. 12a to 16b show preferred arrangements of valve ports in the multi-way valve providing all possible flow combinations, but no no flow position. By using very much smaller diameter ports on the same pitch circle diameter, these valves can provide a no flow position halfway between each two adjacent flow positions, if so desired. When this is required, it is not permissible to join two adjacent ports together.

It would be possible to have one or more ways through the valve permanently open; such ways would not require a sensor in the controller.

If the valve is being operated by manual control, suitable indications (not shown) can be provided to indicate which ways are open, and the body of the valve can be arranged such that either a manual control or an automatic control can be fitted.

In certain applications, particularly in the field of central heating, a no flow condition is not required when the pump which circulates the fluid can be switched off and no flow can take place without the pump, or if the heat source can be switched off, and there is no effective heating through flow of the fluid may still exist. For these reasons the valve is in general terms preferably provided with means such as a switch for de-energizing an output which output normally energizes a pump and/or a heater. This de-energizing means may operate in any or all or some of the intermediate positions between flow positions of the valve, but when the valve is provided with a no flow position, the means preferably operates at the no flow position.

I claim:

1. In a circulating hot fluid heating system comprising duct means defining a circuit including at least two sub-circuits in parallel with one another, a motor-driven, multi-way valve for controlling the flow of the hot fluid in said sub-circuits, said valve having a body and a movable valve member movable relative to said body and said valve defining a plurality of ways therethrough and having positions for each way and for at least one combination of said ways, motor means for driving said valve, heating means for heating said fluid, and means remote from the heating means for extracting heat from said fluid, a position controller comprising:

sensors corresponding to positions of respective said ways through said valve, each said sensor having an open state (corresponding valve way open) and a closed state (corresponding valve way closed) and also first (corresponding valve way to be opened) and second (corresponding valve way to be closed) conditions and comprising selector switch means for switching the sensor from the open to the closed state and from the closed to the open state, control switch means for switching the sensor from the first to the second condition and from the second to the first condition, and circuit connector means interconnecting said selector switch means, said control switch means and said motor whereby said motor is energised by said sensor when said sensor is in its first condition and closed state and when said sensor is in its second condition and open state, and said motor is not energised by said sensor when said sensor is in its first condition and open state and when said sensor is in its second condition and closed state, and at least one selector member for moving in a fixed relationship with said movable valve member, for actuating said selector switch means to change said sensors from respective open to closed states and closed to open states.

2. The position controller as claimed in claim 1, wherein said control and selector switches are change-over switches each having two poles and being connected in series by having respective said poles connected to each other.

3. The position controller as claimed in claim 2, and further comprising an output switch, an output member for moving with said movable valve member and opening said output switch when said movable valve member is in a no flow position, and an output controlled by said output switch.

4. The position controller as claimed in claim 1, wherein said selector switch is a change-over switch having two poles and said control switch is an on-off switch, and wherein said circuit connector means comprises a subsidiary change-over switch having two poles and in parallel with said control switch, said selector switch being connected in series with said control switch by having one of its said poles connected to the control switch, and being in series with said subsidiary switch by having its other said pole connected to one of the said poles of said subsidiary switch, an outut being connected to the other said pole of said subsidiary switch.

5. A position controller as claimed in claim 4, wherein said selector members put all the associated said sensors into said closed state at all intermediate positions between flow positions of said valve.

6. The position controller as claimed in claim 1, and further comprising a locator member in a fixed relationship with said movable valve member, and an associated locator switch for energising said motor a small distance past each said position of the said valve and for maintaining this energisation up to the next said position precisely, thereby allowing said sensors corresponding to said ways through said valve to determine whether said valve stops at said next position or proceeds to a further position, said locator member actuating said locator switch.

7. The position controller as claimed in claim 6, wherein said control and selector switches are change-over switches each having two poles and being connected in series by having respective said poles connected to each other, said position controller further comprising an output switch, an output member for moving with said movable valve member and opening said output switch when said movable valve member is in a no flow position, and an output controlled by said output switch, said locator switch being connected to the output side of said output switch.

8. The position controller as claimed in claim 7, wherein said valve has a no flow position, said locator member does not have a locating position corresponding to said no flow position, and said output switch de-energises said motor precisely at said no flow position.

9. The position controller as claimed in claim 6, wherein said selector switch is a change-over switch having two poles and said control switch is an on-off switch, and wherein said circuit connector means comprises a subsidiary change-over switch having two poles and in parallel with said control switch, said selector switch being connected in series with said control switch by having one of its said poles connected to the control switch, and being in series with said subsidiary switch by having its other said pole connected to one of the said poles of said subsidiary switch, an output being connected to the other said pole of said subsidiary switch, said locator switch being fed from a live input to said position controller or from the live output of said subsidiary switches, said valve having a no flow position, and said locator member having a zone corresponding to said no flow position.

10. The position controller as claimed in claim 1, wherein all said selector members operate the associated said sensors to the closed state at at least one position intermediate any consecutive, defined flow positions of said valve.

11. The position controller as claimed in claim 3, and further comprising a locator member in a fixed relationship with said movable valve member, and an associated locator switch for energising said motor a small distance past each said position of the said valve and to maintain this energisation up to the next said position precisely, thereby allowing said sensors corresponding to said ways through said valve to determine whether said valve stops at said next position or proceeds to a further position, said locator actuating said locator switch, and wherein all said selector members operate the associated said sensors to the closed state at at least one position intermediate any consecutive, defined flow positions of said valve, said output switch being operated by said locator member.

12. The position controller as claimed in claim 11, wherein said output switch is displaced about said locator member from said locator switch by half the distance between two flow positions of said valve plus any number of whole distances between two flow positions of said valve.

13. The position controller as claimed in claim 1, wherein the movement of said at least one selector member is rotary, wherein said at least one selector member is a cam and wherein said selector switch means comprise mechanically actuable switches actuated by at least one said cam.

14. In a circulating hot fluid heating system comprising duct means defining a circuit including at least two subcircuits in parallel with one another, heating means for heating said fluid and means remote from the heating means for extracting heat from said fluid, a combination of a motor-driven, multi-way valve for controlling the flow of the hot fluid in said sub-circuits and a position controller for controlling the position of said valve, said valve having a body and a rotary valve member movable relative to said body and said valve defining a plurality of ways therethrough and having positions for each way and for each possible combination of said ways, and said position controller comprising sensors corresponding to positions of respective said ways through said valve, each said sensor having an open state (corresponding valve way open) and a closed state (corresponding valve way closed) and also first (corresponding valve way to be opened) and second (corresponding valve way to be closed) conditions and comprising selector switch means for switching the sensor from the open to the closed state and from the closed to the open state, control switch means for switching the sensor from the first to the second condition and from the second to the first condition, and circuit connector means interconnecting said selector switch means, said control switch means and said motor whereby said motor is energised by said sensor when said sensor is in its first condition and closed state and when said sensor is in its second condition and open state, and said motor is not energised by said sensor when said sensor is in its first condition and open state and when said sensor is in its second condition and closed state, and at least one rotary selector member for moving in a fixed relationship with said rotary valve member, for actuating said selector switch means to change said sensors from respective open to closed states and closed to open states.

15. In a circulating hot fluid heating system comprising duct means defining a circuit including at least two subcircuits in parallel with one another, a motor-driven, multiway valve for controlling the flow of the hot fluid in said sub-circuits, said valve having a body and a movable valve member movable relative to said body and said valve defining a plurality of ways therethrough and having respective defined positions in which each way is open and at least one combination of said ways is open, motor means for driving said valve, heating means for heating said fluid, and means remote from the heating means for extracting heat from said fluid, a position controller comprising:

sensors corresponding to positions of respective said ways through said valve, each said sensor having a first state (said valve in said defined position in which the corresponding valve way is open) and a second state (said valve not being in said defined position in which the corresponding valve way is open) and also first (said valve to be in said defined position in which the corresponding valve way is open) and second (said valve not to be in said defined position in which the corresponding valve way is open) conditions and comprising selector switch means for switching the sensor from the first to the second state and from the second to the first state, control switch means for switching the sensor from the first to the second condition and from the second to the first condition, and circuit connector means interconnecting said selector switch means, said control switch means and said motor whereby said motor is energised by said sensor when said sensor is in its first condition and second state and when said sensor is in its second condition and first state, and said motor is not energised by said sensor when said sensor is in its first condition and first state and when said sensor is in its second condition and second state, at least one selector member for moving in a fixed relationship with said movable valve member, for actuating said selector switch means to change said sensors from respective first to second states and second to first states, an output, switch means for de-energizing said output, and means for actuating said switch means when all said sensors are in said second states and said second conditions.

16. In a circulating hot fluid heating system comprising duct means defining a circuit including at least two subcircuits in parallel with one another, a motor-driven, multi-way valve for controlling the flow of the hot fluid in said subcircuits, said valve having a body and a movable valve member movable relative to said body and said valve defining a plurality of ways therethrough and having respective defined positions in which each way is open and at least one combination of said ways is open, motor means for driving said valve, heating means for heating said fluid, and means remote from the heating means for extracting heat from said fluid, a position controller comprising:

sensors corresponding to positions of respective said ways through said valve, each said sensor having a first state (said valve in said defined position in which the corresponding valve way is open) and a second state (said valve not being in said defined position in which the corresponding valve way is open) and also first (said valve to be in said defined position in which the corresponding valve way is open) and second (said valve not to be in said defined position in which the corresponding valve way is open) conditions and comprising selector switch means for switching the sensor from the first to the second state and from the second to the first state, control switch means for switching the sensor from the first to the second condition and from the second to the first condition, and circuit connector means interconnecting said selector switch means, said control switch means and said motor whereby said motor is energised by said sensor when said sensor is in its first condition and second state and when said sensor is in its second condition and first state, and said motor is not energised by said sensor when said sensor is in its first condition and first state and when said sensor is in its second condition and second state, at least one selector member for moving in a fixed relationship with said movable valve member, for actuating said selector switch means to change said sensors from respective first to second states and second to first states, an output, switch means for de-energizing said output, and means for de-energizing said motor and actuating said switch means when all said sensors are in said second conditions.

* * * * *